(12) United States Patent
Hsu

(10) Patent No.: US 12,654,433 B2
(45) Date of Patent: Jun. 16, 2026

(54) FILM LAMINATION ALIGNING DEVICE

(71) Applicant: QI JI ELECTRONICS CO., LTD.,
New Taipei City (TW)

(72) Inventor: Bo-Yuan Hsu, New Taipei City (TW)

(73) Assignee: QI JI ELECTRONICS CO., LTD.,
New Taipei City (CN)

( * ) Notice: Subject to any disclaimer, the term of this
patent is extended or adjusted under 35
U.S.C. 154(b) by 64 days.

(21) Appl. No.: 18/823,708

(22) Filed: Sep. 4, 2024

(65) Prior Publication Data

US 2026/0061737 A1     Mar. 5, 2026

(51) Int. Cl.
| | |
|---|---|
| *B32B 38/18* | (2006.01) |
| *B29C 63/00* | (2006.01) |
| *B29C 63/02* | (2006.01) |
| *B29L 31/34* | (2006.01) |

(52) U.S. Cl.
CPC .......... *B32B 38/1841* (2013.01); *B29C 63/02*
(2013.01); *B29C 2063/0008* (2013.01); *B29L*
*2031/3437* (2013.01)

(58) Field of Classification Search
CPC ........ B29C 65/7835; B29C 2063/0008; B29C
63/0047; B29C 63/02; B29C 66/342;
B29C 66/345; B29C 65/7802; B29C 65/7805; B29C 65/7808; B29C 65/7811;
B29C 65/7814; B29C 65/7817; B29C
65/7841; B32B 38/1841
See application file for complete search history.

(56) References Cited

U.S. PATENT DOCUMENTS

| | | | |
|---|---|---|---|
| 11,090,857 B1* | 8/2021 | Zhong | B29C 63/0004 |
| 2017/0190160 A1* | 7/2017 | Peng | B32B 38/1841 |

* cited by examiner

*Primary Examiner* — Carson Gross
(74) *Attorney, Agent, or Firm* — HDLS IPR SERVICES;
Chun-Ming Shih

(57) ABSTRACT

A film lamination aligning device used for a protective film
and an electronic device includes a carrier board and mul-
tiple elastic retaining strips. The carrier board has an align-
ment structure and an accommodation space formed and
enclosed by the alignment structure, the electronic device is
positioned in the accommodation space, multiple pillars are
extended from the carrier board and situated on one side
inside the accommodation space. The elastic retaining strips
are connected to the carrier board and situated on another
side inside the accommodation space, and the protective film
is disposed at the carrier board and clamped between the
pillars and the elastic retaining strips, so as to form the film
lamination aligning device with the effect of accurately
positioning the protective film.

9 Claims, 10 Drawing Sheets

FILM LAMINATION ALIGNING DEVICE

BACKGROUND OF THE DISCLOSURE

Technical Field

The present disclosure relates to a film lamination auxiliary tool, particularly relates to a film lamination aligning device.

Description of Related Art

Nowadays, mobile phones, tablet PCs and other electronic devices are more and more widely used. In order to avoid scratching the touch screen and affecting the quality of use, or dropping the screen on the ground and damaging the screen, users usually stick a layer of protective film with high hardness, abrasion resistance and impact resistance on the screen.

In order to help users to apply the film by themselves, a film lamination auxiliary device is introduced on the market, where this film lamination auxiliary device has a carrier plate and a plurality of retaining strips that is extended from the carrier plate and enclosed into a frame, the protective film is placed on the carrier plate and positioned by the plurality of retaining strips, and the electronic device is placed above the protective film at the position corresponding to the plurality of retaining strips, so as to complete the film operation.

However, due to the processing and manufacturing, the size of the protective film will have a manufacturing tolerance, which may cause an offset position of the protective film, and finally the protective tape attached to the electronic device will be deviated and skewed biased, resulting a poor function of the film lamination auxiliary device.

In view of this problem, the discloser of the present disclosure conducted extensive research and experiment and developed the present disclosure to solve the above-mentioned problem, which is the goal of the discloser's improvement.

SUMMARY OF THE INVENTION

The present disclosure provides a film lamination aligning device, which a protective film is clamped between a plurality of pillars and a plurality of elastic retaining strips to prevent burrs of the pillar and the elastic retaining strip from contacting the protective film, so as to achieve the precise positioning effect of the protective film by the film lamination aligning device.

In some embodiments, the present disclosure provides a film lamination aligning device, used in a protective film and an electronic device, the film lamination aligning device including: a carrier board, including an alignment structure and an accommodation space formed and enclosed by the alignment structure, the electronic device being positioned in the accommodation space, a plurality of pillars extending from the carrier board and being disposed on one side inside the accommodation space; and a plurality of elastic retaining strips, connected to the carrier board and disposed on another side inside the accommodation space, and the protective film being disposed at the carrier board and clamped between the plurality of pillars and the plurality of elastic retaining strips.

Based on the above, the protective film is clamped between the plurality of pillars and the plurality of elastic retaining strips and positioned on the carrier board. Compared with the related-art method of blocking the outer peripheral edge of the protective film through the retaining strips and using surface-to-surface positioning method, the present disclosure uses the pillars and elastic retaining strips to block the outer edge of the protective film and adopts the point-to-surface positioning method, which may prevent the pillars and elastic retaining strips from contacting the rough edge of the protective film, thereby greatly improving the precision of positioning the protective film, so as to achieve the effect of accurately positioning the protective film by the film lamination aligning device.

DETAILED DESCRIPTION

The detailed description and technical contents of the present disclosure are illustrated in the following diagrams, which are for illustrative purposes only and are not intended to limit the present disclosure.

Figure 1:
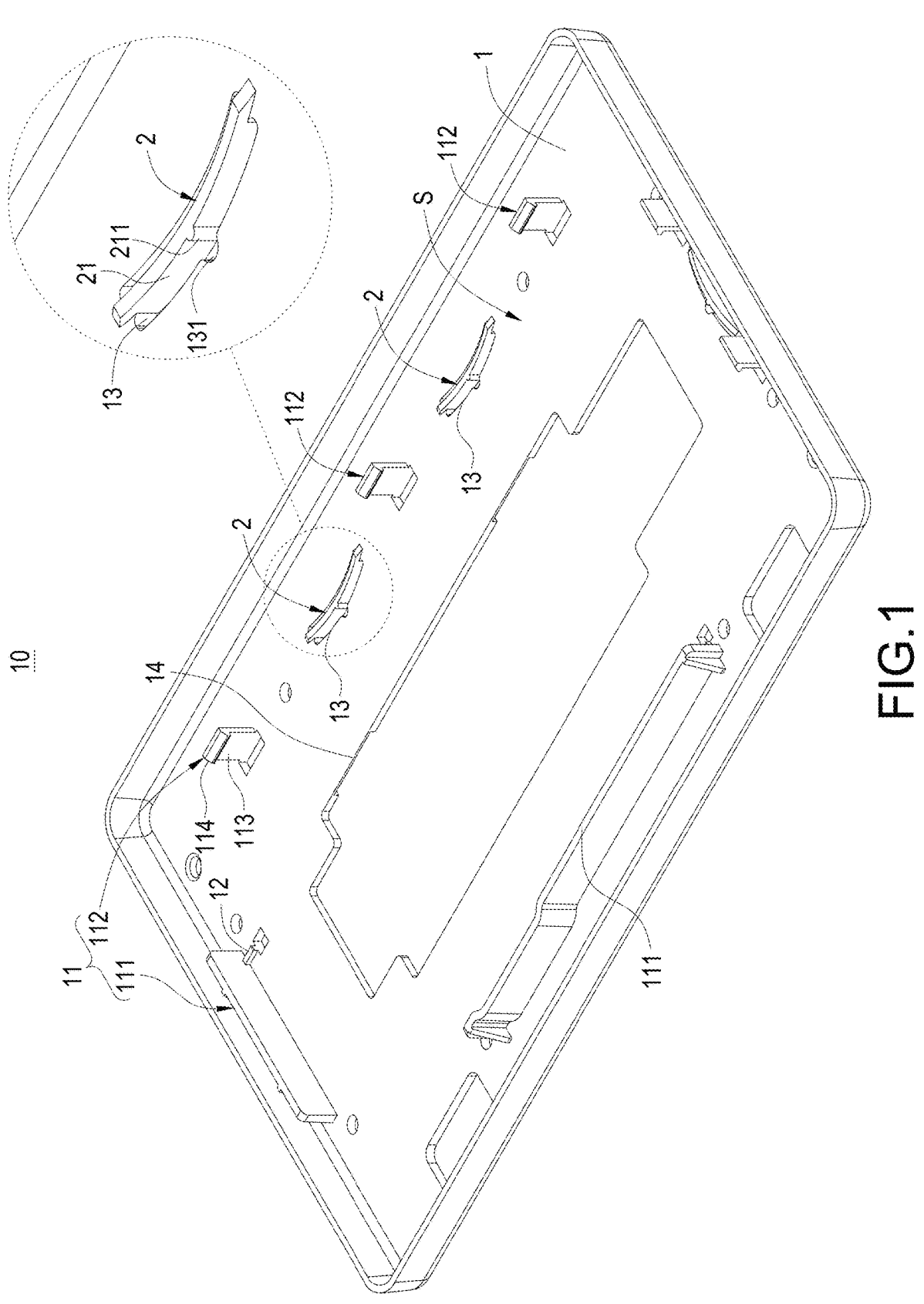
FIG. 1 is a perspective diagram of the film lamination aligning device of the present disclosure.
Figure 2:
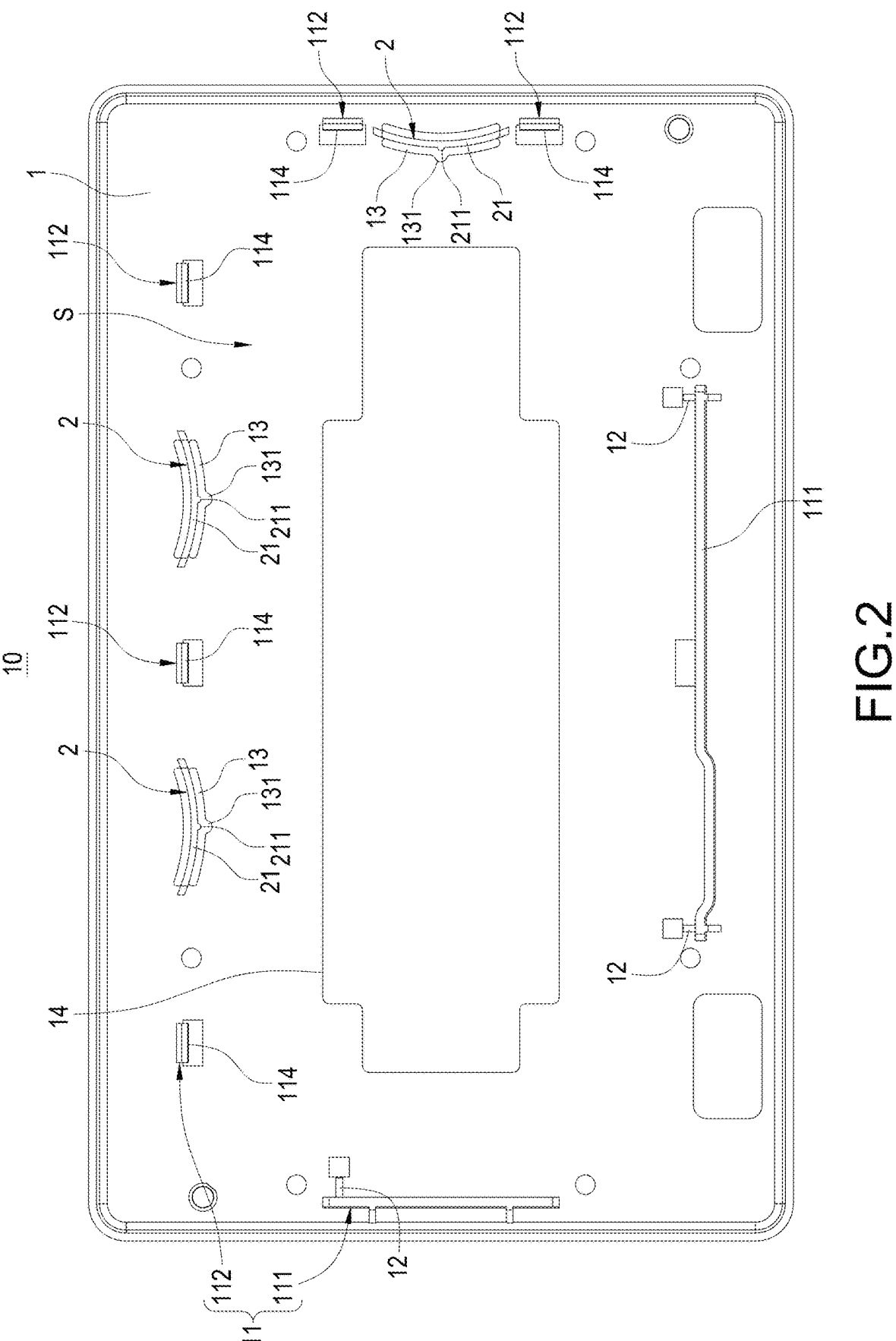
FIG. 2 is a top diagram of the film lamination aligning device of the present disclosure.
Figure 3:
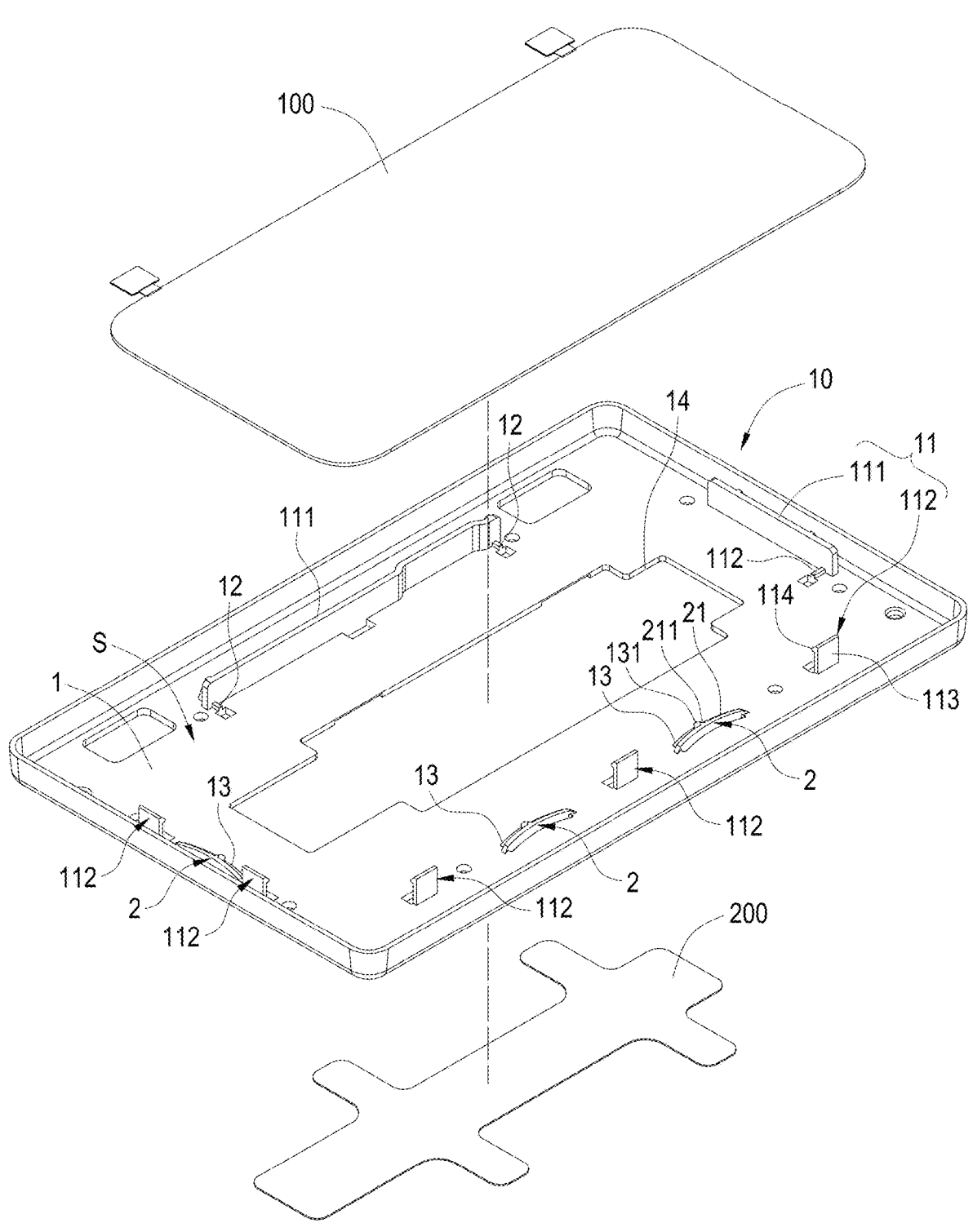
FIG. 3 is a perspective diagram showing a first using status of the film lamination aligning device of the present disclosure.
Figure 4:
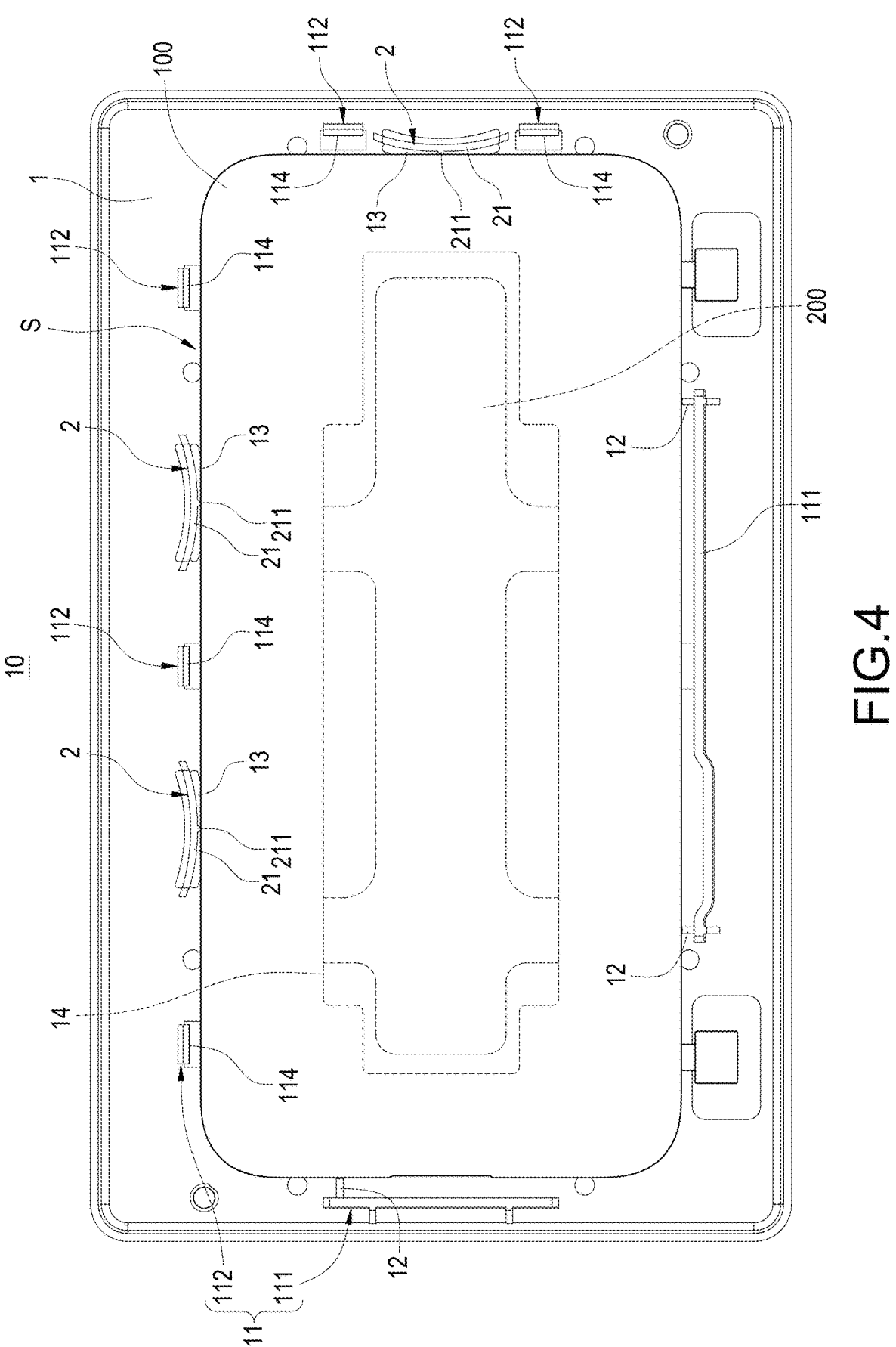
FIG. 4 is a top diagram showing the second using status of the film lamination aligning device of the present disclosure.
Figure 5:
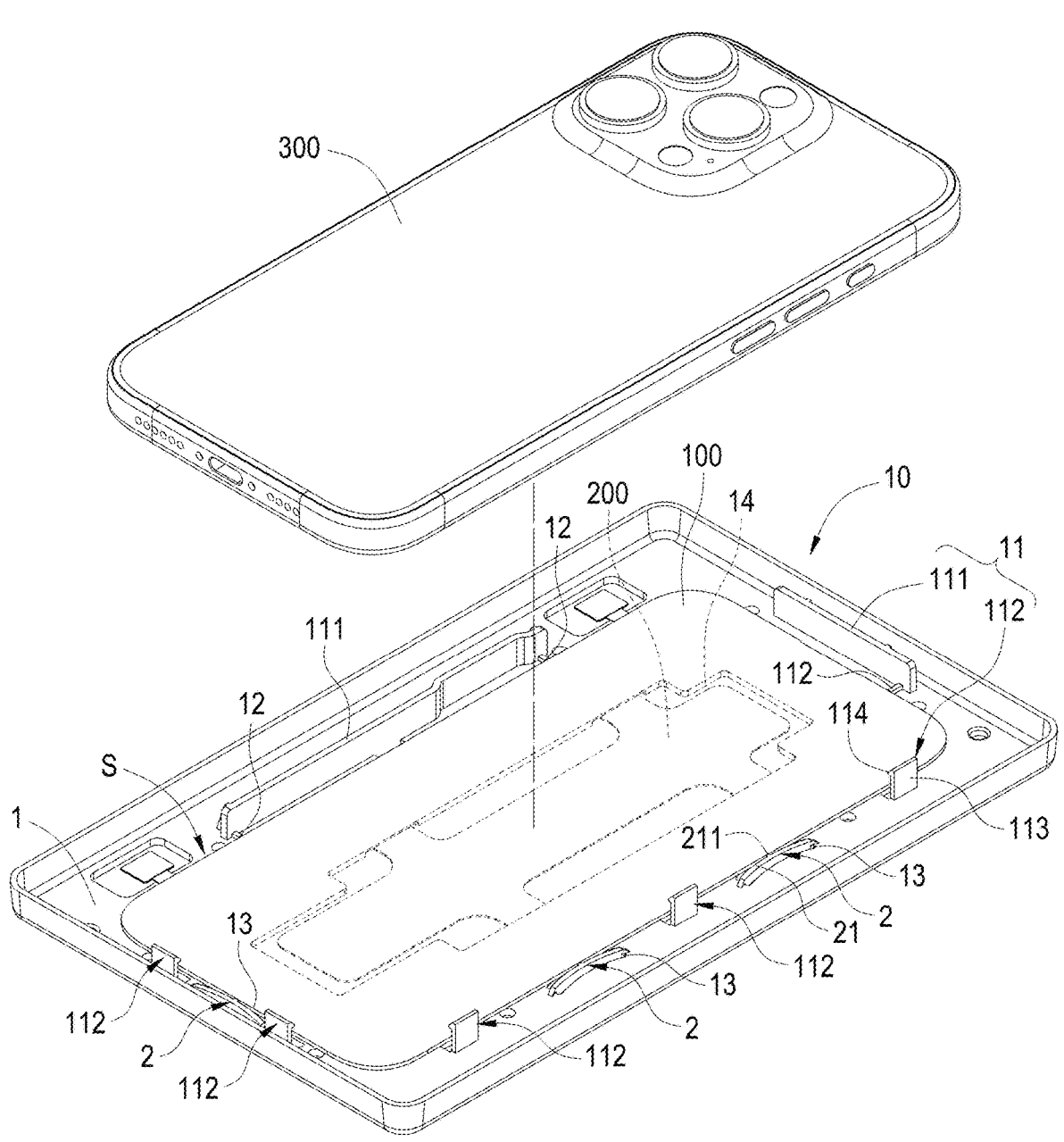
FIG. 5 is a perspective diagram showing a third using status of the film lamination aligning device of the present disclosure.
Figure 6:
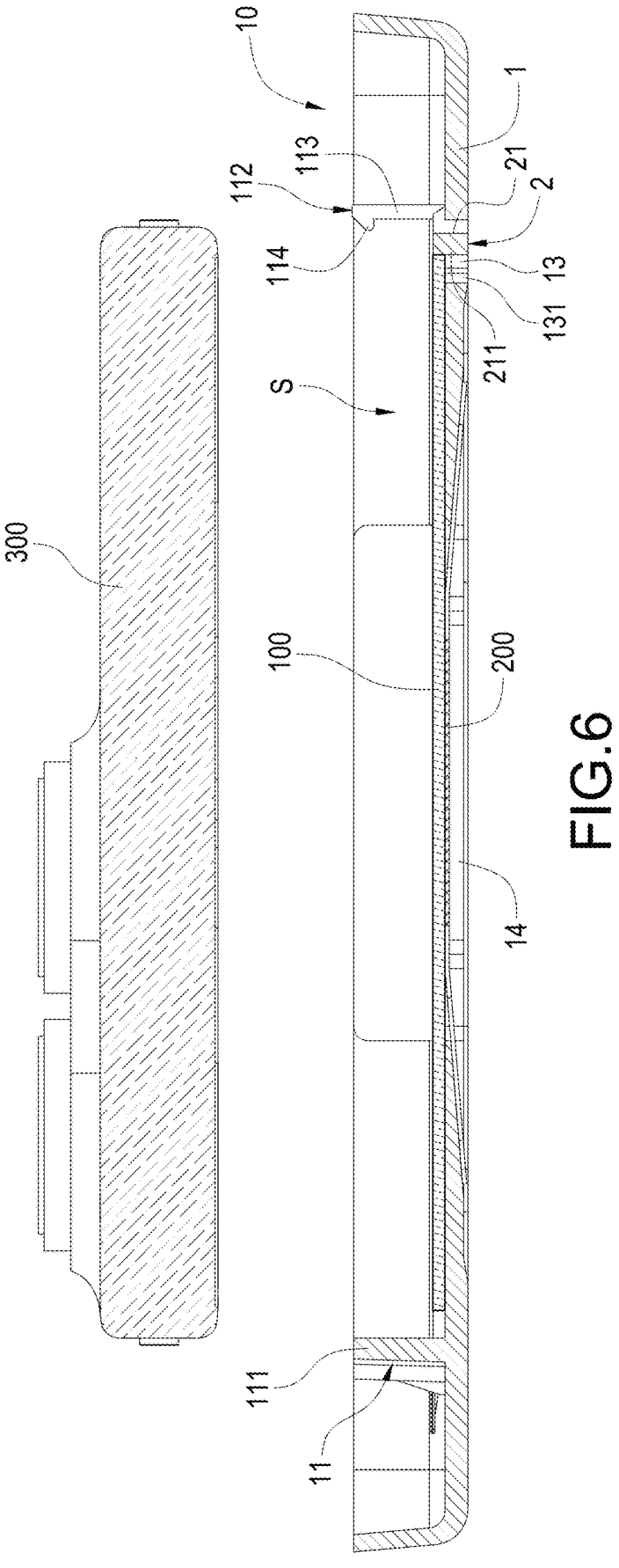
FIG. 6 is a cross-sectional diagram showing the third first using status of the film lamination aligning device of the present disclosure.
Figure 7:
FIG. 7 is a perspective diagram showing a fourth using status of the film lamination aligning device of the present disclosure.
Figure 8:
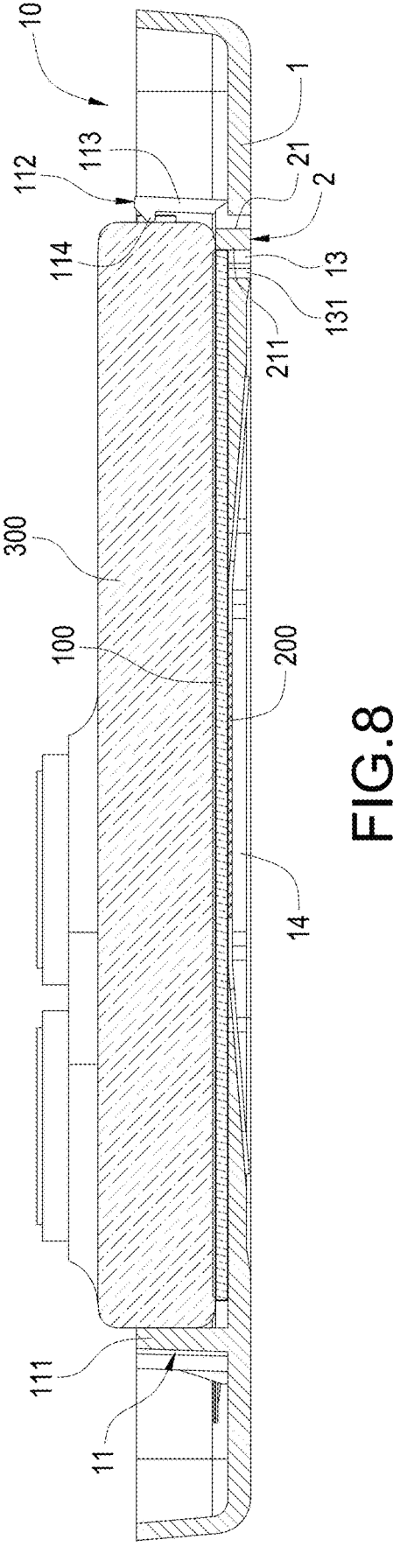
FIG. 8 is a cross-sectional diagram showing the fourth using status of the film lamination aligning device of the present disclosure.
Figure 9:
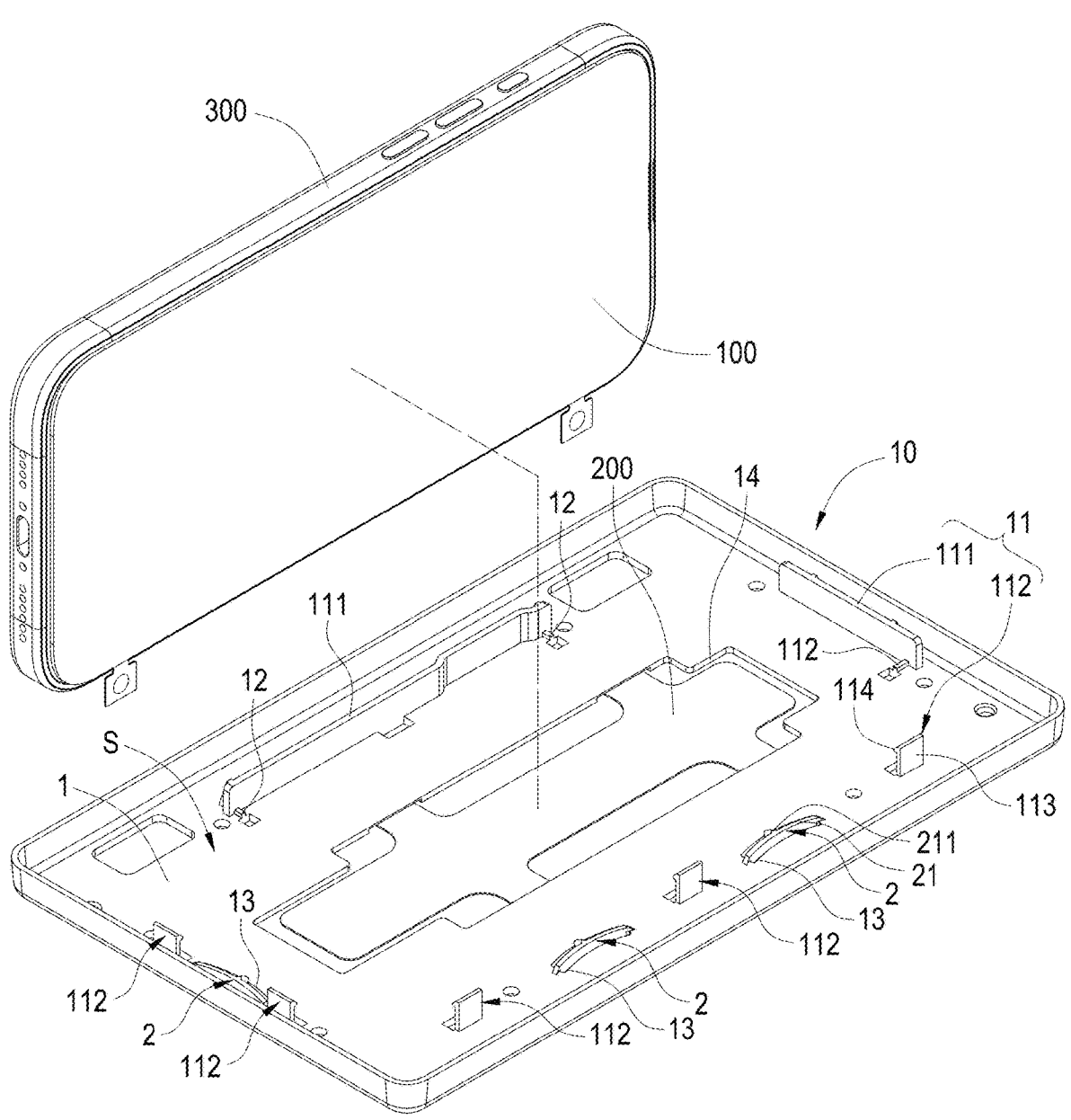
FIG. 9 is a perspective diagram showing a fifth using status of the film lamination aligning device of the present disclosure.
Figure 10:
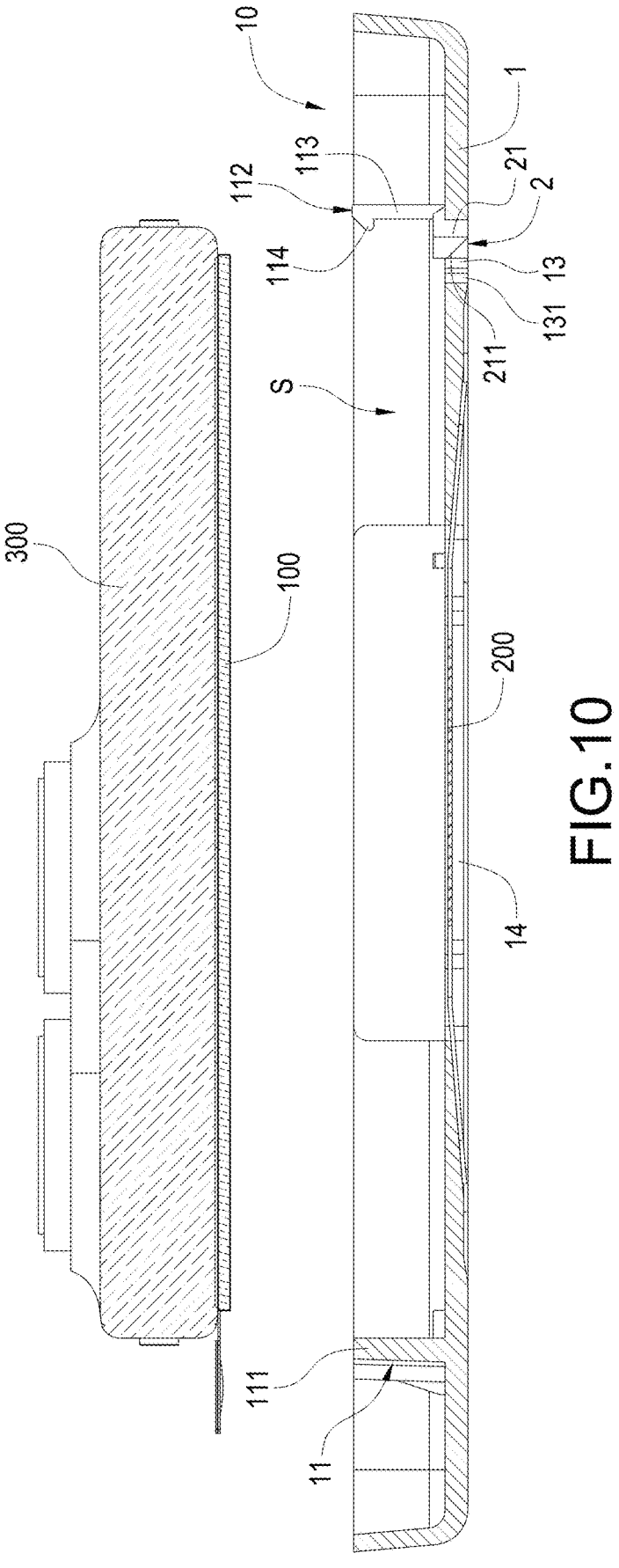
FIG. 10 is a cross-sectional diagram showing the fifth using status of the film lamination aligning device of the present disclosure.

With reference to FIGS. 1 to 10 for the film lamination aligning device of the present disclosure, the film lamination aligning device is used to a protective film 100, a film fixing sticker 200 and an electronic device 300, and the film lamination aligning device 10 includes a carrier board 1 and a plurality of elastic retaining strips 2.

In FIGS. 1 to 10, the carrier board 1 includes an alignment structure 11, and the carrier board 1 is provided with an accommodation space S enclosed and formed by the alignment structure 11 for accommodating the electronic device 300, the electronic device 300 is positioned in the accommodation space S, and the carrier board 1 is provided with a plurality of pillars 12 extending from one side inside the accommodation space S.

In the detailed description below, the alignment structure 11 includes a plurality of strip stoppers 111 and a plurality of snap blocks 112 extending from the carrier board 1, each snap block 112 includes an upright plate 113 extending from the carrier board 1 and a hook 114 protruding an end of the upright plate 113, a part of the strip stoppers 111 and a part of the snap blocks 112 which are arranged on right and left sides, and another part of the strip stoppers 111 and another part of the snap blocks 112 which are arranged on upper and lower sides.

In addition, the plurality of pillars 12 extends from a side of the plurality of strip stoppers 111 adjacent to the accommodation space S, and the axial direction of each pillar 12 is perpendicular to a side of the strip stopper 111 adjacent to the accommodation space S, but the present disclosure is not limited to such arrangement only, and each pillar 12 may extend from the top of the carrier board 1 directly, and the axial direction of each pillar 12 may be parallel to the top surface of the carrier board 1.

Further, the carrier board 1 includes a plurality of hollow trenches 13, each hollow trench 13 is in the shape of a curve strip, but the present disclosure is not limited to this shape only, and the inner sidewall of each hollow trench 13 adjacent to the accommodation space S is provided with a notch 131, and the carrier board 1 is further provided with a cross hollow groove 14 on the middle of the accommodation space S.

In FIGS. 1 to 10, the plurality of elastic retaining strips 2 is connected to the carrier board 1 and disposed on another side inside the accommodation space S, and the protective film 100 is set on the carrier board 1 and clamped between the plurality of pillars 12 and the plurality of elastic retaining strips 2.

In the further description below, each elastic retaining strip 2 is disposed between two snap blocks 112 adjacent to each other, and provided with a curved protruding strip 21 extending from the carrier board 1, straddling and connecting two sides of each hollow trench 13 and inwardly protruding towards the accommodation space S, each curved protruding strip 21 is accommodated in each hollow trench 13, two ends of each curved protruding strip 21 and two inner sidewalls of each hollow trench 13 are integrally formed, and a bump 211 protrudes from a side of each curved protruding strip 21 adjacent to the accommodation space S corresponding to each notch 131.

In addition, the pillar 12 and the elastic retaining strip 2 of this embodiment disposed on two sides of the accommodation space S are misaligned with each other, but the present disclosure is not limited to such arrangement, and the pillar 12 and the elastic retaining strip 2 disposed on two sides of the accommodation space S may be opposite to each other.

The height from the top of each pillar 12 and the top of each elastic retaining strip 2 to the carrier board 1 is equal to or less than the thickness of the protective film 100, such that when the protective film 100 is set onto the carrier board 1 and clamped between the plurality of pillars 12 and the plurality of elastic retaining strips 2, the plurality of pillars 12 and the plurality of elastic retaining strips 2 may not protrude from the top surface of the protective film 100, that is, the pillar 12 and the elastic retaining strip 2 may not abut against the electronic device 300, and may not interfere with the stability of positioning the electronic device 300 in the accommodation space S.

In addition, the height of each pillar 12 is smaller than the height of each strip stopper 111 and the height of each snap block 112, the height of each elastic retaining strip 2 is smaller than the height of each strip stopper 111 and the height of each snap block 112, such that the electronic device 300 is clamped between each strip stopper 111 and each snap block 112, and disposed between each pillar 12 and each elastic retaining strip 2.

With reference to FIGS. 3 to 10 for the using statuses of the film lamination aligning device 10 of the present disclosure, the protective film 100 is clamped between the plurality of pillars 12 and the plurality of elastic retaining strips 2 first, and then the film fixing sticker 200 is attached to a position corresponding to the cross hollow groove 14 and attached to a release paper on the bottom surface of the protective film 100, and the release paper on the top surface of the protective film 100 is torn way to expose the adhesive layer. Then, the electronic device 300 is positioned in the accommodation space S through the alignment structure 11 and stably aligned and stacked on the adhesive layer on the top surface of the protective film 100. Finally, when the electronic device 300 is removed from the film lamination aligning device 10, the top surface of the protective film 100 is separated together with the electronic device 300 from the film lamination aligning device 10 due to the attachment of the adhesive layer to the electronic device 300, and only the release paper on the back surface of the protective film 100 is still attached by the film fixing sticker 200, so as to complete the film lamination operation.

In this way, the protective film 100 is clamped between the plurality of pillars 12 and the plurality of elastic retaining strips 2 and positioned on the carrier board 1. Compared to the related-art method of using a retaining strip to stop the outer peripheral edge of the protective film and using a surface-to-surface positioning method, the present disclosure uses a point-to-point positioning method to stop the outer circumference of the protective film 100 through the pillar 12 and the elastic retaining strip 2, the present disclosure may further prevent the pillar 12 and the elastic retaining strip 2 from contacting the rough edge of the protective film 100, thereby greatly improving the positioning precision of the protective film 100 and achieving the effect of accurately positioning the protective film 100 by the film lamination aligning device 10.

In addition, each elastic retaining strip 2 is a curved protruding strip 21 extending from the carrier board 1, straddling and connecting two sides of each hollow trench 13 and inwardly curving toward the accommodation space S, so the curved protruding strip 21 may be elastically expanded and contracted. If the protective film 100 has some slight tolerances or rough edges, the curved protruding strip 21 may match the slight deformation and firmly contact the protective film 100, allowing the protective film 100 to be firmly positioned between the plurality of pillars 12 and the plurality of elastic retaining strips 2, thus further enhancing the precision of locating the protective film 100 by the film lamination aligning device 10.

Furthermore, in this embodiment, each curved protruding strip 21 has a bump 211 protruding from a surface adjacent to the accommodation space S. Through the bump 211, the contact area between the elastic retaining strip 2 and the protective film 100 is reduced, and the point-to-surface positioning method may be used more reliably.

In this embodiment, the pillar 12 and the elastic retaining strip 2 respectively disposed on two sides of the accommodation space S are misaligned with each other, so that the clamping stress point of the protective film 100 is dispersed to prevent the issue of uneven force and stress concentration when the film lamination aligning device 10 positions the protective film 100.

In addition, the alignment structure 11 includes a plurality of strip stoppers 111 and a plurality of snap blocks 112 extending from the carrier board 1, a part of the strip stoppers 111 and a part of the snap blocks 112 are arranged on the left and right sides, and another part of the strip stoppers 111 and another part of the snap blocks 112 are arranged on upper and lower sides, such that a side of the electronic device 300 is stopped by the strip stopper 111, and another side of the electronic device 300 is snapped by the snap block 112, and thus the electronic device 300 is stably positioned in the accommodation space S.

While this disclosure has been described by means of specific embodiments, numerous modifications and variations may be made thereto by those skilled in the art without departing from the scope and spirit of this disclosure set forth in the claims.

What is claimed is:

1. A film lamination aligning device, used for a protective film and an electronic device, the film lamination aligning device comprising:
   a carrier board having opposite first sides and opposite second sides;
   an alignment structure including a plurality of strip stoppers disposed on one first side and one second side, and a plurality of snap blocks disposed on another first side and another second side, wherein an accommodation space is enclosed by the plurality of strip stoppers and the plurality of snap blocks;
   a plurality of pillars extending from the plurality of strip stoppers and disposed on the carrier board inside the accommodation space; and
   a plurality of elastic retaining strips connected to the carrier board and each disposed between two adjacent snap blocks, wherein the protective film is disposed on the carrier board and clamped between the plurality of pillars and the plurality of elastic retaining strips, and the electronic device is positioned in the accommodation space to be disposed on the protective film and clamped between the plurality of strip stoppers and the plurality of snap blocks.

2. The film lamination aligning device according to claim 1, wherein the carrier board comprises a plurality of hollow trenches, and each elastic retaining strip is a curved protruding strip extending from the carrier board, straddling two sides of each hollow trench, and curving inwards into the accommodation space.

3. The film lamination aligning device according to claim 2, wherein each curved protruding strip is accommodated in each hollow trench, and two ends of each curved protruding strip are integrally formed with two inner sidewalls of each hollow trench.

4. The film lamination aligning device according to claim 3, wherein each hollow trench comprises a notch defined on a side adjacent to the accommodation space, and each curved protruding strip comprises a bump protruding from a side adjacent to the accommodation space corresponding to the notch.

5. The film lamination aligning device according to claim 1, wherein the pillars and the elastic retaining strips are asymmetrically arranged.

6. The film lamination aligning device according to claim 1, wherein the plurality of pillars extends from a side of the plurality of strip stoppers adjacent to the accommodation space, and an axial direction of each pillar is perpendicular to a side of the strip stopper adjacent to the accommodation space.

7. The film lamination aligning device according to claim 1, wherein each snap block comprises an upright plate extending from the carrier board and a hook protruding from an end of the upright plate.

8. The film lamination aligning device according to claim 1, wherein a height of each pillar is smaller than a height of each strip stopper and a height of each snap block, a height of each elastic retaining strip is smaller than the height of each strip stopper and the height of each snap block, and the electronic device is clamped between each strip stopper and each snap block and disposed above each pillar and each elastic retaining strip.

9. The film lamination aligning device according to claim 1, wherein a height from top of each pillar and top of each elastic retaining strip to the carrier board is equal to or less than a thickness of the protective film, and the carrier board comprises a cross hollow groove defined on a middle of the accommodation space.

* * * * *